United States Patent [19]

Su

[11] Patent Number: 5,458,050
[45] Date of Patent: Oct. 17, 1995

[54] MULTI-PURPOSE COOKER

[76] Inventor: Johnson Su, 262, Section 2, Mintsu Road, Tainan, Taiwan

[21] Appl. No.: 183,008

[22] Filed: Jan. 14, 1994

Related U.S. Application Data

[63] Continuation-in-part of Ser. No. 83,368, Jun. 25, 1993, abandoned, and Ser. No. 24,384, Mar. 1, 1993, Pat. No. 5,311,673.

[51] Int. Cl.⁶ ............................. A23L 3/16; F26B 3/16; F26B 21/06; F26B 23/06
[52] U.S. Cl. ............................. 99/340; 34/195; 34/197; 99/357; 99/417; 99/446; 99/450; 99/476; 99/483; 219/386; 219/400; 219/401
[58] Field of Search ............................. 99/446, 450, 447–449, 99/467, 468, 473, 340, 476, 357, 483, 416, 417; 34/195–197, 192, 211, 225, 238; 219/400, 401, 406, 386; 126/21 A; 312/236

[56] References Cited

U.S. PATENT DOCUMENTS

| | | | |
|---|---|---|---|
| 1,893,694 | 1/1933 | Bohmker | 219/400 |
| 3,943,842 | 3/1976 | Bills et al. | 99/473 |
| 4,190,965 | 3/1980 | Erickson | 34/196 |
| 4,236,063 | 11/1980 | Glucksman | 219/386 |
| 4,380,127 | 4/1983 | Roberts | 99/483 |
| 4,536,643 | 8/1985 | Erickson | 219/400 |
| 4,780,596 | 10/1988 | Matsushima et al. | 126/21 A |
| 5,097,753 | 3/1992 | Naft | 99/450 |
| 5,215,004 | 6/1993 | Su | 99/483 |
| 5,216,947 | 6/1993 | Cheng | 99/448 |
| 5,235,906 | 8/1993 | Hsu | 34/197 |

Primary Examiner—Timothy F. Simone
Attorney, Agent, or Firm—Caesar, Rivise, Bernstein, Cohen & Pokotilow, Ltd.

[57] ABSTRACT

A multi-purpose cooker (10) having a base member (12) including a compartment (20) therein, a cover member (14) cooperable with the base member (12) for providing a food-steaming and food-dehydrating chamber (16) including the compartment (20) of the base member (12), a food retaining member (e.g., 42) retainable in the chamber (16) for supporting food to be dehydrated, and a food retaining member (e.g., 48) retainable in the chamber (16) for supporting food to be steamed. Preferably the base member (12) includes a heater (22) and a switch (78) for selectively energizing the heater (22) for heating water (11) retained in the compartment (20) during the steaming operation. Most preferably the base member (12) also includes a fan assembly (58), and the switch (78) is operable to selectively energize a motor (62) of the fan assembly (58) and the heater (22) simultaneously for dehydrating food, and to energize the heater (22) without the motor (62) of the fan assembly (58) for steaming food. Alternatively, separate switches can be provided for use in dehydrating food and steaming food, respectively.

24 Claims, 7 Drawing Sheets

MULTI-PURPOSE COOKER

RELATED APPLICATIONS

This application is a continuation-in-part of U.S. patent application Ser. No. 08/083,368, filed on Jun. 25, 1993, now abandoned, in the name of Johnson Su, and entitled "A Multi-Purpose Cooker"; and U.S. patent application Ser. No. 08/024,384, filed Mar. 1, 1993, now U.S. Pat. No. 5,311,673.

BACKGROUND OF THE INVENTION

This invention relates generally to a multi-purpose cooker and more specifically to a multi-purpose cooker usable for both steaming and dehydrating foods.

Cooking devices for use in steaming foods and for dehydrating foods are known in the art. However, to the best of applicant's knowledge, the steaming of foods and the dehydrating of foods have been carried out in completely separate devices. This is not surprising since the steaming and dehydrating functions are antithetical to each other. That is, the steaming of foods requires a hot, moist environment employing steam, whereas the dehydrating of food requires a hot, dry environment for removing water from the food. It is no wonder that no one has thought to design a single appliance usable for both steaming and dehydrating foods.

OBJECTS OF THE INVENTION

It is a general object of this invention to provide a combined steaming and dehydrating appliance or apparatus.

It is a more specific object of this invention to provide a combined steaming and dehydrating apparatus which can reliably dehydrate foods such as vegetables, fruits, and the like.

It is a further object of this invention to provide a combined steaming and dehydrating apparatus which can evenly dehydrate foods such as vegetables, fruits, and the like.

It is still a further object of this invention to provide a combined steaming and dehydrating apparatus which can be used to steam foods.

It is still a further object of this invention to provide a combined steaming and dehydrating apparatus which can be used to cook foods.

It is yet a further object of this invention to provide a combined steaming and dehydrating apparatus which is light in weight and adapted for household use.

SUMMARY OF THE INVENTION

The above and other objects of this invention are achieved in a multi-purpose cooker having a base member including a compartment therein, a cover member cooperable with the base member for providing a food-steaming and food-dehydrating chamber including the compartment of said base member, food retaining means retainable in the chamber for supporting food to be dehydrated, and food retaining means retainable in the chamber for supporting food to be steamed.

In the preferred-embodiment of the invention, the base member includes a heater and a switch for selectively energizing said heater for heating water retained in the compartment during the steaming operation. Most preferably the base also includes a fan assembly including a motor, and the switch is operable to selectively energize the motor of the fan assembly and the heater simultaneously for dehydrating food, and to energize the heater without the motor of the fan assembly for steaming food.

In the preferred embodiment of this invention, the cover member includes venting passage means for air and steam communicating with the interior chamber of the cooker.

In the preferred embodiment of the invention, the food retaining member that is retainable in the chamber for supporting food to be dehydrated includes a porous food supporting surface through which dry heated air in the chamber can pass. Most preferably a second, or different, food retaining member is retainable in the chamber for supporting food to be steamed. During the steaming operation water is retained in the compartment of the base member and the heater is energized by the switch for heating the water to generate steam.

In the preferred embodiment of the invention, a plurality of food retaining members having porous food supporting surfaces are provided for use in supporting food to be dehydrated, and these members are vertically stackable on each other with the porous food supporting surface of each of the food retaining members being vertically spaced from the porous food supporting surface of an adjacent food retaining member.

Most preferably a separate support member is retainable in the compartment of the base member under the food retaining member that is utilized to support food for steaming. In one form of the invention the support member includes a collection trough for collecting condensate generated during the steaming of foods.

In the preferred embodiment of the invention, a food retaining member utilized during the steaming operation includes a bottom wall for retaining food to be steamed thereon, said bottom wall including a first liquid-impervious section for retaining condensate thereon and a second section at which condensate can leave said food retaining member. In one form of the invention a separate support member is retainable in the compartment of the base member under the food retaining member that is utilized to support food for steaming, and that support member includes a collection trough for collecting condensate that leaves the food retaining member at the second section of the bottom wall.

In the most preferred embodiment of the invention the bottom wall of the food retaining member employed to retain food during the steaming operation includes passages through which condensate generated in the steaming operation can exit the retaining member. Most preferably the base member includes an inner wall defining a compartment for retaining water during the steaming operation, a passage extending through the inner wall, a heater, and a fan means for directing air into close proximity to the heater and through said passage into the food-steaming and food-dehydrating chamber of the device when the fan means is energized during the food-dehydrating mode of operation of the cooker. Preferably the base member of the cooker includes a switch having a first position for energizing both said fan means and said heater for dehydrating food, and a second position for energizing said heater without energizing said fan means to steam food.

Most preferably a closure member is provided for closing the opening into the passage extending through the inner wall of the base member when food is being steamed to prevent condensate generated during the steaming operation from entering the passage and possibly damaging the heater and/or fan. Most preferably the closure is part of a support member that also is employed to support the food retaining member utilized to support food during the steaming operation.

In one form of the invention a number of different food retaining members can be provided for use in retaining food during the steaming and/or dehydrating operations. For example, a conventional pan having a bottom wall that is completely impervious to liquids can be employed for steaming a variety of food items, both liquid and solid. Also, a retaining member can be provided including a plurality of spaced, egg-supporting members on a surface thereof.

BRIEF DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENTS OF THE INVENTION

Figure 1:
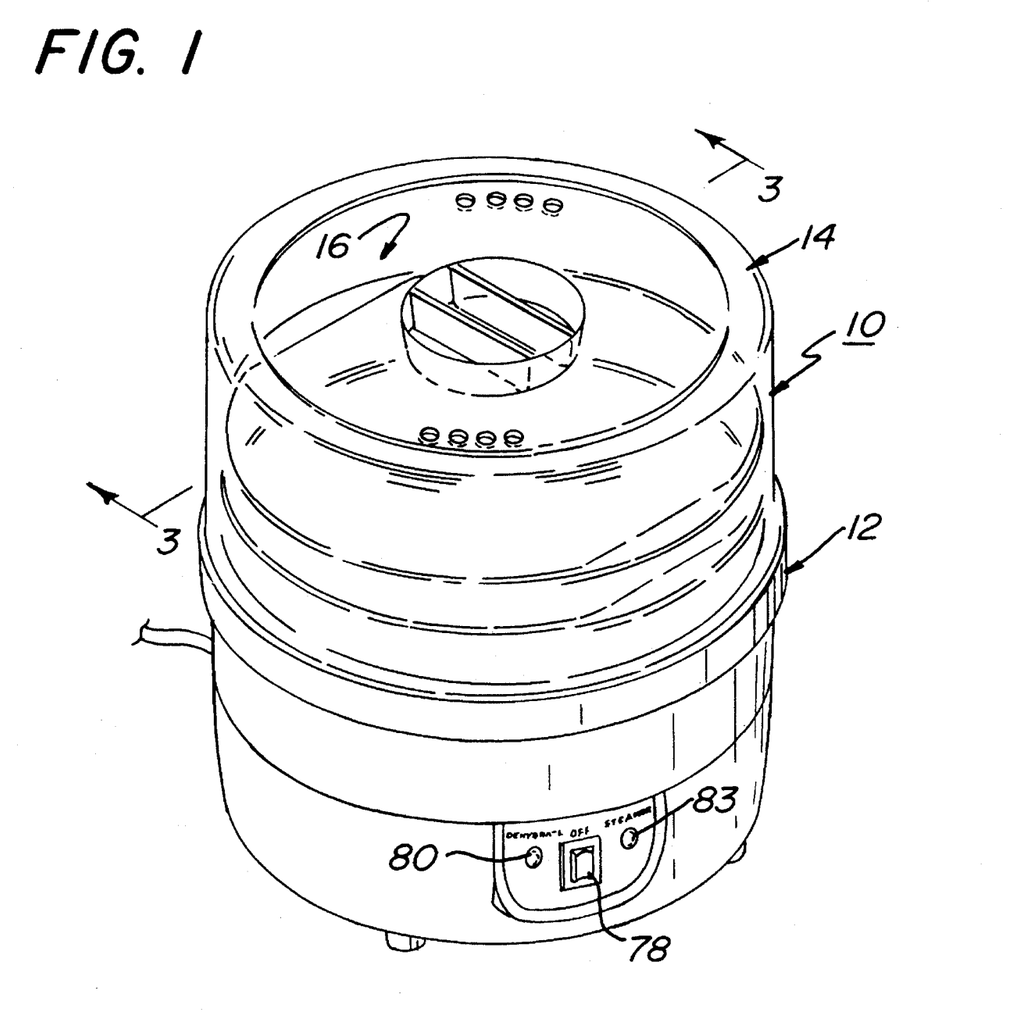
FIG. 1 is an isometric view of a multi-purpose cooker in accordance with this invention, as packaged for storage or shipping.

Referring now in greater detail to the various figures of the drawings wherein like reference characters refer to like parts, a multi-purpose cooker embodying the present invention is generally shown at 10 in FIG. 1. The device 10 basically comprises a base member 12 and a cover member 14 defining an internal chamber 16 in which a number of food retaining members and a support member are retained. Details relating to these food retaining members and the support member will be described later herein. Suffice it to state for the present, the cooker shown in FIG. 1 includes all of the components which are utilizable for either steaming or dehydrating foods, and all of these components are easily assembled within the chamber 16 for storage or shipment of the cooker 10.

Figure 2:
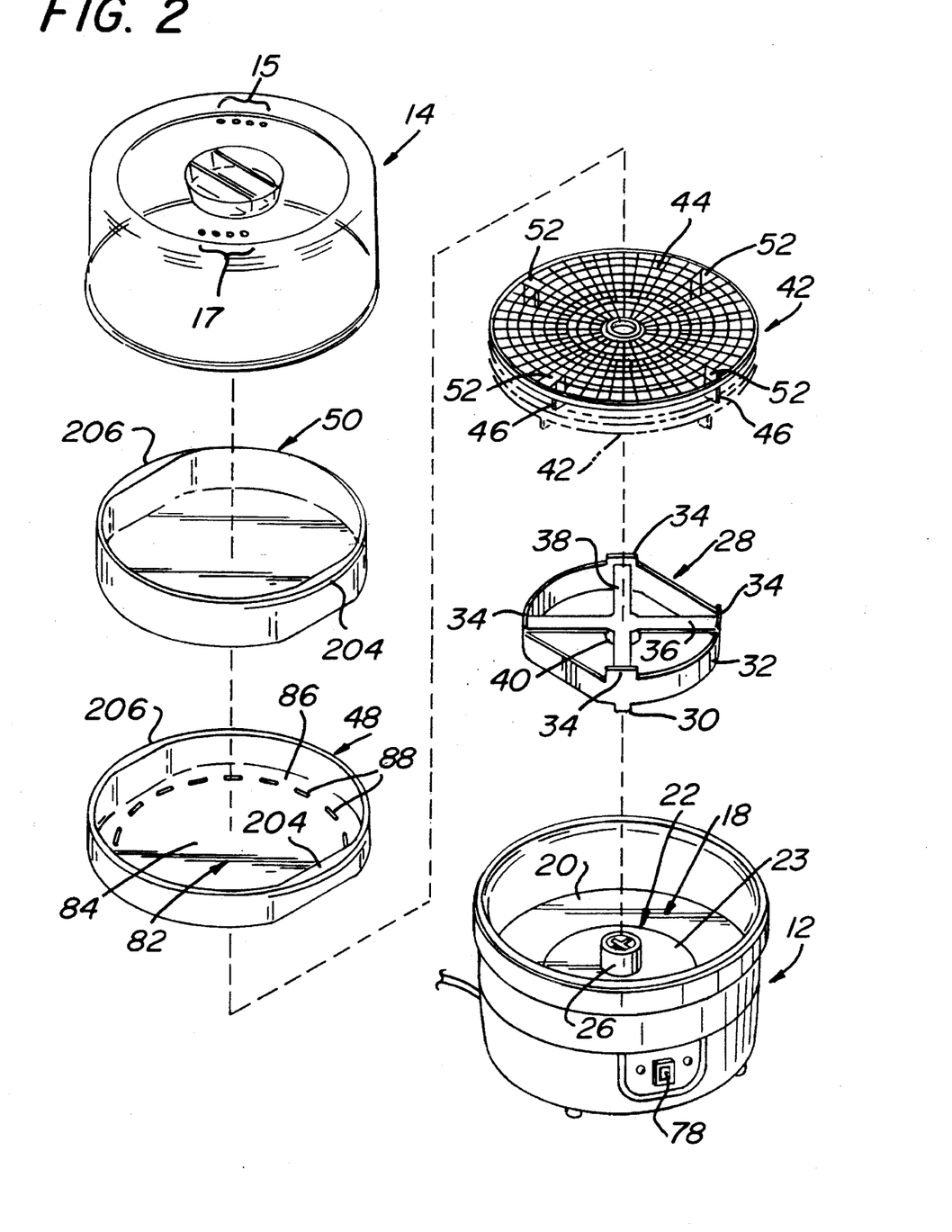
FIG. 2 is an exploded isometric view of the multi-purpose cooker shown in FIG. 1.
Figure 3:
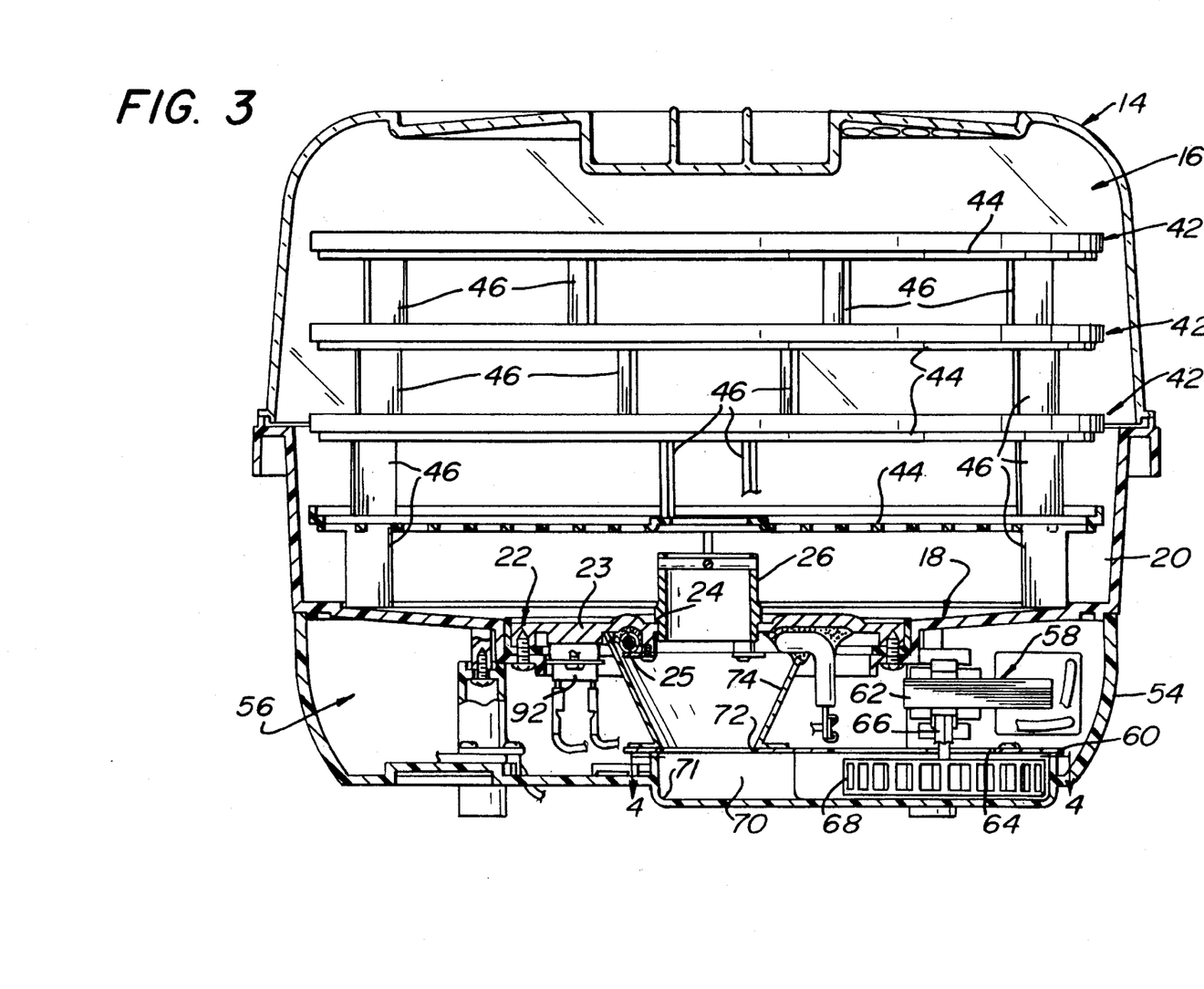
FIG. 3 is a vertical cross-sectional view taken along line 3—3 of FIG. 1, but showing only components utilized when the cooker is employed to dehydrate food.

Referring specifically to FIG. 2 and 3, the base member 12 includes an inner wall 18 defining a compartment 20 therein. A heater 22 includes a conductive plate 23 forming part of the inner wall 18, and this conductive plate includes a central passage 24 therethrough. This passage 24 communicates with the chamber 16 through a cylindrical chimney 26 extending upwardly from the conductive plate 23 of the heater 22.

It should be understood that, except for the provision of passage 24 in the conductive plate 23, the heater 22 is of a conventional design including encapsulated heating coils 25 (FIG. 3) on the lower surface of said conductive plate.

Referring specifically to FIG. 2, a support member 28 includes four downwardly extending projections, or legs, 30 (only one of which is illustrated in FIG. 2) spaced about the circumference thereof and being seated on the inner wall 18 of the base member 12. This support member 28 includes a peripheral wall 32 with a plurality of circumferentially spaced-apart, upstanding lugs 34 integrally molded therewith. A pair of arms 36 and 38 cross each other in the interior region bound by the peripheral wall 32, and these arms include a downwardly facing cylindrical closure, or hub, 40 at their crossing location.

Figure 5:
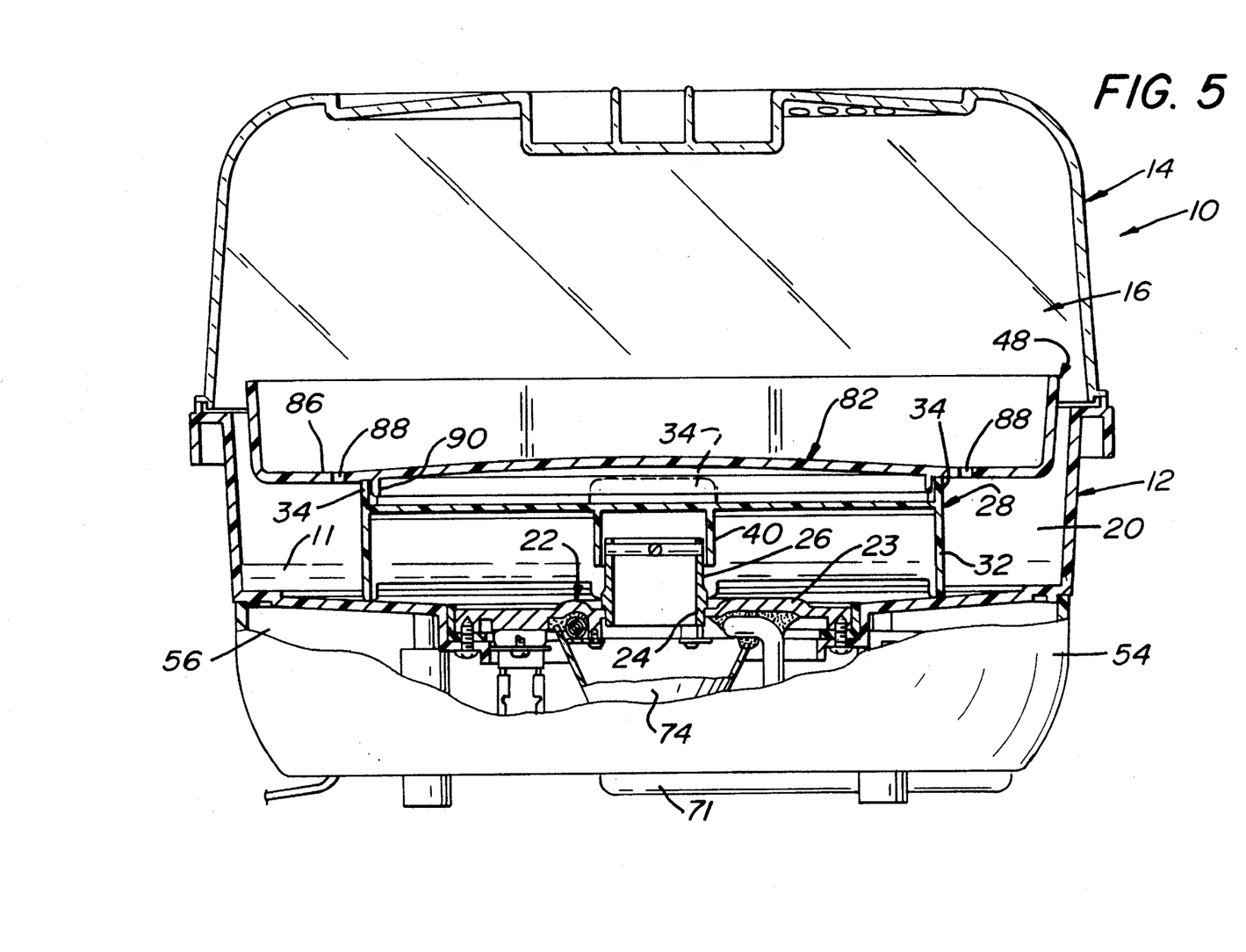
FIG. 5 is a partial vertical sectional view similar to FIG. 3, but showing only components utilized when the cooker is employed to steam food.

When the cooker 10 is being used to steam food, as is illustrated in FIG. 5, the hub 40 of the support member 28 seats over the cylindrical chimney 26 to close the passage 24 formed through the heater 22, and the upstanding lugs 34 of the support member support, and assist in positioning, food retaining members employed to retain food to be steamed, as will be described in greater detail hereinafter.

Referring again to FIG. 2, in the packaged or stored condition of the cooker 10, a plurality of vertically stackable food retaining members 42 of identical construction are maintained in a collapsed or nested condition on the support member 28. Specifically, each of the food retaining members 42 includes an upper, porous wall 44 for supporting food to be dehydrated in the cooker 10 and downwardly projecting legs 46 circumferentially spaced apart about the periphery of the wall 44. The legs 46, in the packaged or stored condition of the cooker 10, straddle the peripheral wall 32 of the support member 28, and the lower surface of the upper wall 44 of the lowermost member 42 engages the upper surfaces of the upstanding lugs 34.

Still referring to FIG. 2, two food retaining members 48 and 50, which are particularly suited for use in supporting food to be steamed in the cooker 10, are stacked on top of the nested food retaining members 42. Preferably, the diameter of the food retaining member 50 is sufficiently smaller than the diameter of the food retaining member 48 to permit the member 50 to seat within the member 48 when the unit is packaged for shipment or storage. It should be understood that in accordance with the broadest aspects of this invention it is not required to form the food retaining members 48 and 50 of different sizes. Moreover, it is also within the scope of this invention to form the member 48 of a smaller diameter than the member 50, to permit the member 48 to be stacked within the member 50. In this latter case the food retaining member 50 will be the member supported on the stacked food retaining members 42.

Referring to FIGS. 1 and 2, the cover member 14 includes vent passages extending through the upper wall thereof. In the preferred embodiment the cover includes two sets 15 and 17 of vent passages. These vent passages prevent the undesired build up of pressure within the cooker 10.

Referring specifically to FIG. 3, the arrangement and cooperation of components employed when the cooker is being utilized to dehydrate food is illustrated. First, it should be noted that at least one of the vertically stackable food retaining members 42 is employed to support food to be dehydrated, e.g., fruits, vegetables, and the like. Most preferably a plurality of the retaining members 42 are employed in a non-nested condition to support the food on different vertical tiers, as is shown in FIG. 3. Specifically, each of the food retaining members 42 is positioned relative to its immediately underlying member 42 such that the legs 46 of the upper member rest on the porous food supporting upper wall 44 of the underlying member. It should be noted that the upper wall 44 of each of the food retaining members 42 includes circumferentially spaced-apart, enlarged openings 52 (FIG. 2) extending through it for receiving the legs 46 of the immediately overlying food retaining member 42 therethrough when it is desired to collapse, or nest, the plurality of food retaining members 42. This is a conventional and well-known design feature.

Figure 4:
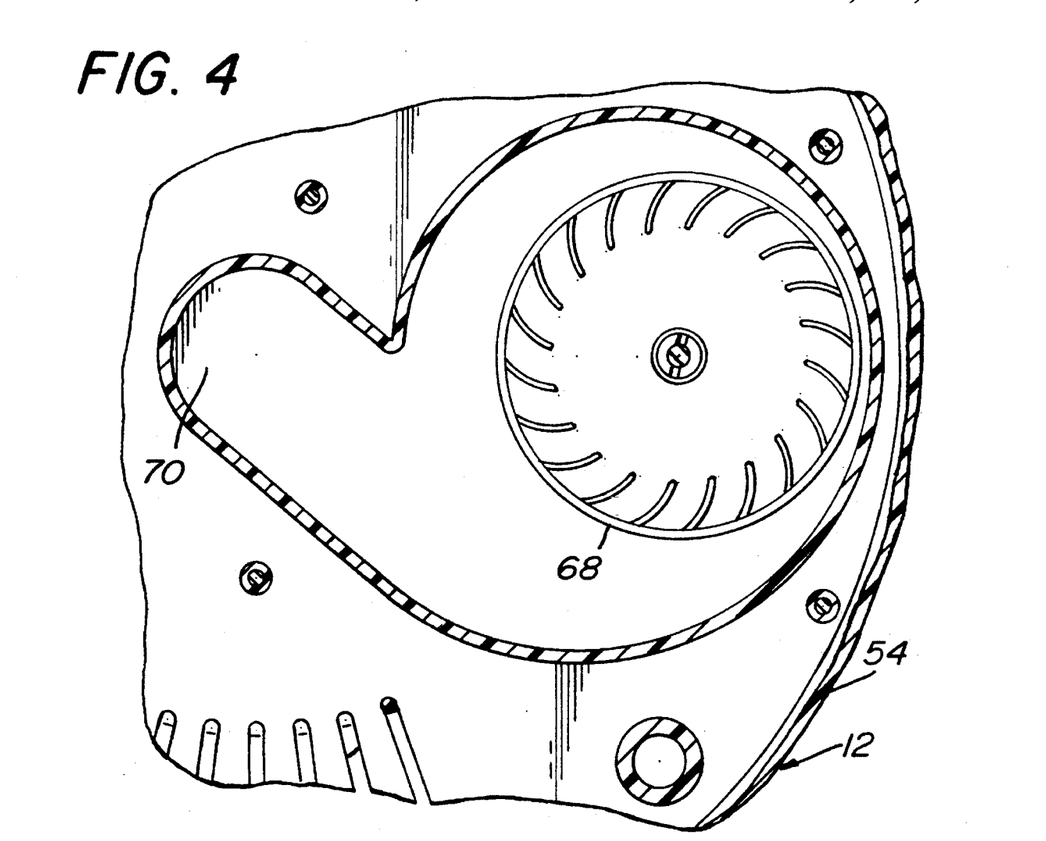
FIG. 4 is a horizontal sectional view taken along line 4—4 of FIG. 3.

Referring to FIGS. 3 and 4, the base member 12 includes an outer base wall 54 spaced from the inner wall 18 to define a space 56 therebetween in which a fan assembly 58 is housed. The fan assembly 58 includes a mounting plate 60 having a motor 62 attached thereto by screws or other suitable fasteners, an aperture 64 extending through the mounting plate 60 in alignment with the driven output shaft 66 of the motor, and an impeller 68 disposed on the side of the mounting plate opposite the motor and connected to the output shaft 66 of said motor. Therefore, when the motor 62 is energized to rotate the output shaft 66 thereof, the impeller will be rotated to generate air flow.

Referring specifically to FIGS. 3 and 4, the air flow generated by the rotating impeller is directed through a confining channel 70 that communicates the impeller with an air outlet port 72 in the mounting plate 60. It should be noted that the channel 70 is provided by the cooperation of a generally cup-shaped segment 71 of the outer base wall 54 with the mounting plate 60 of the fan assembly 58.

A conical air-guiding member 74 is secured to the mounting plate 60 by any conventional means, such as by welding. This air-guiding member 74 has a central passage 76 aligned with the outlet port 72 in the mounting plate and with the central passage 24 through the conductive plate member 23 of the heater 22 to guide the air generated by the rotating impeller 68 into close proximity with the encapsulated heating coils 25 of the heater 22 for heating the air. The heated air, which is essentially dry, then is directed through the passage 24, the chimney 26, and into the internal chamber 16 for contacting the food supported on the porous food supporting wall 44 of the food retaining member(s) 42 to dehydrate said food. From the above explanation it should be apparent that both the heater 22 and the motor 62 of the fan assembly are energized when the cooker 10 is employed to dehydrate foods.

Figure 9:
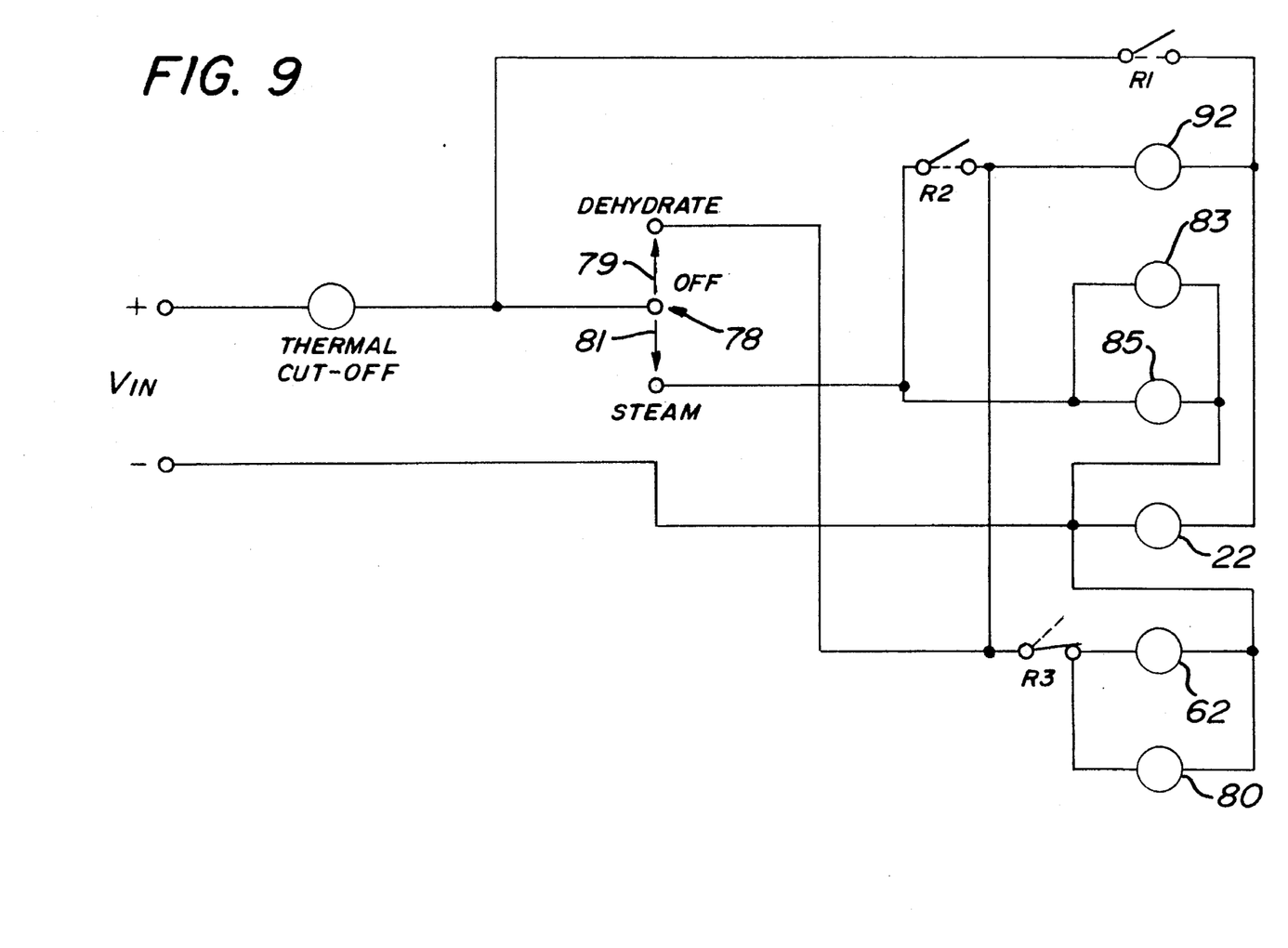
FIG. 9 is a schematic view of a circuit utilized in the present invention.

Referring to FIGS. 1 and 9, when the cooker 10 is to be used in the dydrating mode, the switch 78 is moved to the left as viewed in FIG. 1 and as is schematically indicated by arrow 79 in FIG. 9. In this condition the switch provides a single-contact switch action, and remains closed until it is moved back to its center "off" position. When the switch 78 is in its closed condition, power is supplied through circuitry in latching relay 85, with the latching relay in its off condition, to power the heater 22 through thermostat 92, the motor 62 of the fan assembly 8, and the indicator light 80. It should be noted that in the "off" condition of relay 85, relay switch R3 is closed and relay switches R1 and R2 are open, as shown in solid line representation in FIG. 9.

Referring now to FIG. 5, an arrangement of components is illustrated for use in steaming foods in the cooker 10. In particular, the embodiment illustrated in this Figure employs the food retaining member 48 to support the food to be steamed. It should be noted that this member 48 has a bottom wall 82 having a central, liquid-impervious section 84 for supporting the food and for precluding any condensate formed thereon during the steaming operation from passing therethrough. In addition, the bottom wall 82 includes a peripheral section 86 including a plurality of circumferentially spaced-apart passages 88 through which condensate collected in the food retaining member 48 can pass. To direct the condensate to the peripheral section 86 so that the condensate can exit the member 48 through the passages 88, the bottom wall 82 is sloped slightly downwardly from the center thereof to the outer periphery thereof.

As described earlier, and as is shown in detail in FIG. 5, during the steaming operation the support member 28 is employed to cover the central passage 24 through the conductive plate member 23 of the heater 22 to preclude liquid from entering the region 56 housing the fan motor 62 and the wiring thereto. In addition, the support member 28 functions to support the food retaining member 48 so that the bottom wall 82 thereof is disposed above the distal edge of the cylindrical chimney 26, and to properly position the member 48 within the internal chamber 16 of the cooker 10. Specifically, the bottom wall 82 of the food retaining member 48 includes a short, downwardly extending annular flange 90 which has a diameter slightly less than the diameter of the peripheral wall 32 of the support member 28. This arrangement positions the lugs 34, which are integrally formed extensions of the peripheral wall 32, around and in close proximity to the downwardly extending annular flange 90 to aid properly positioning the food retaining member 48 within the internal chamber 16 of the cooker. This same cooperative arrangement exists between a downwardly extending flange (not shown) on the bottom wall of the food retaining member 50 and the lugs 34 of the support member 28.

It should be understood that in steaming some foods, and in particular solid foods, condensate will form on the food being steamed and drip onto the food supporting surface of the food retaining member. To prevent an undesired build up of condensate it is preferable to use a food retaining member which permits the condensate to escape from, or leave, the food retaining member, such as the food retaining member 48. However, when it is desired to steam liquids, such as soup, the food retaining member should be free of liquid-pervious surfaces through which the liquid to be cooked can escape. For these latter applications, a food retaining member of the type illustrated at 50 is most desirable.

Still referring to FIG. 5, it should be noted that in the steaming operation of the cooker 10 water, which is illustrated at 11, is retained within the compartment 20 of the base member 12 and is heated to generate steam by energizing the heater 22, without energizing the fan.

To operate the cooker 10 in the steaming mode, the switch 78 is moved to the right, as viewed in FIG. 1 and as is schematically indicated by arrow 81 in FIG. 9. In this mode of operation the switch 78 functions as a momentary switch, and, after initially closing the circuit, automatically returns to an open switch position. When the switch is momentarily closed, the relay 85 closes to energize the coil and latch the rely down. This opens relay switch R3 and closes relay switches R1 and R2, as shown in dotted lines in FIG. 9, to remove the motor 62 from the circuit and complete the circuit to the thermostat 92, heater 22 and indicator light 83. Power to the relay coil is then derived from the thermostat 92, to maintain the relay in its latched condition. In this condition of the circuit the heater 22 functions to boil the water 11 to steam, until such time as the compartment either is almost dry (e.g., 20% of the water remains) or is completely dry, depending on the operating specifications of the thermostat 92. In any event, when the thermostat 92 reaches a predetermined high temperature level, as determined by its operating specifications, it opens to shut off the heater 22, and also drop (i.e., unlatch) the relay 85 out of the circuit to open contacts R1 and R2, and close contact R3 of the relay 85. This prevents the relay 85from reclosing (i.e., becoming latched) when the thermostat 92 recloses during cool down of the cooker 10. Thus, the heater 22 will not be reenergized during cool down of the cooker.

It should be noted that the switch 78 can be designed solely as a single contact switch for use only in energizing the cooker 10 when it is to be operated in its dehydrating mode. In such an embodiment of the invention, a separate start button (not shown) which functions as a momentary switch, could be employed to energize the cooker 10 when it is to be operated in its steaming mode. However, this is not considered to be a preferred arrangement in this invention.

Figure 6:
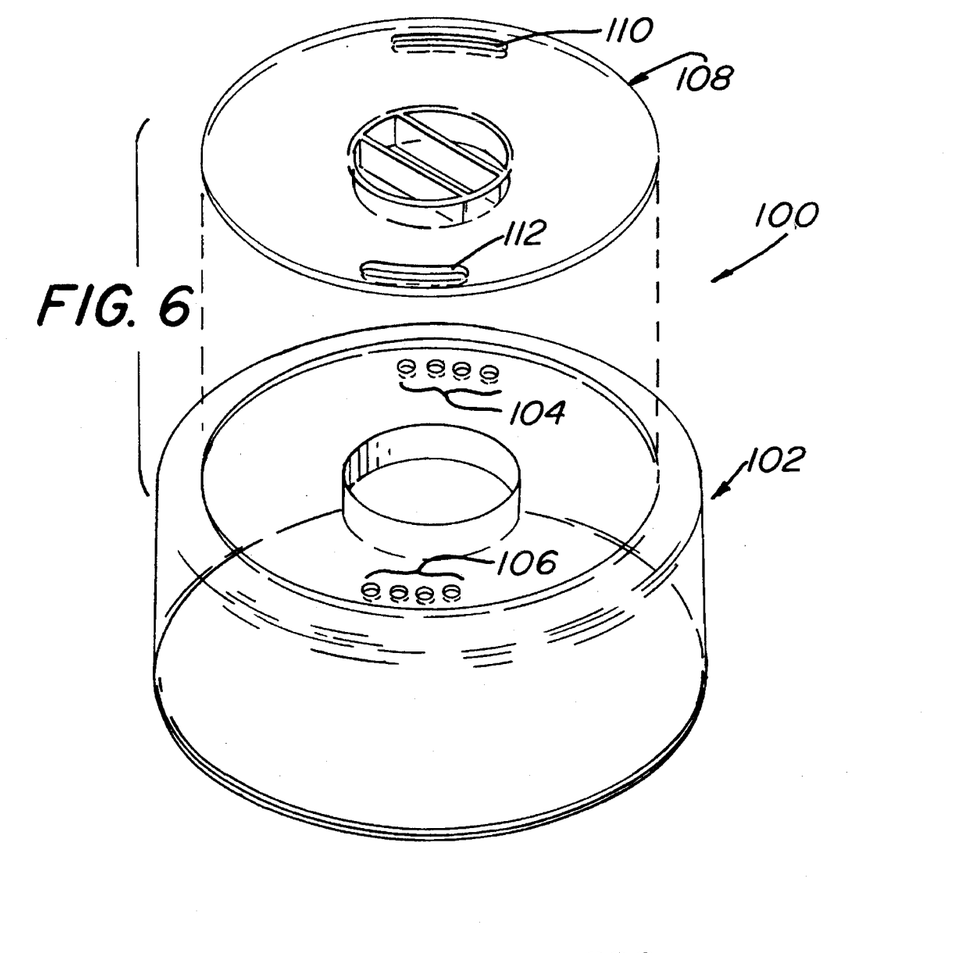
FIG. 6 is an exploded isometric view of a modified cover member which can be used in the multi-purpose cooker of this invention.

Referring to FIG. 6, an alternative embodiment of a cover is shown at 100. In the illustrated embodiment the cover includes a lower, or first, section 102 having two sets of venting passages 104 and 106 through the top thereof, and a top, or second, section 108 having a pair of arcuate passages 110 and 112 therethrough. The top section 108 is rotatable relative to the lower section 102 for selectively opening or closing a portion or all of said passages in the sets 104 and 106, as desired.

It should be understood that although the illustrated embodiment of the cover 100 incudes two sets of venting passages 104 and 106, the number of such sets can be varied. For example, the lower section can be provided with four of said sets disposed 90 degrees from each other. In this latter design the top section 108 would be provided with four arcuate passages, also disposed 90 degrees from each other.

While the cover 100 may be desirable for certain applications, it has not been found to be necessary for use in the most preferred embodiment of the invention.

Figure 7:
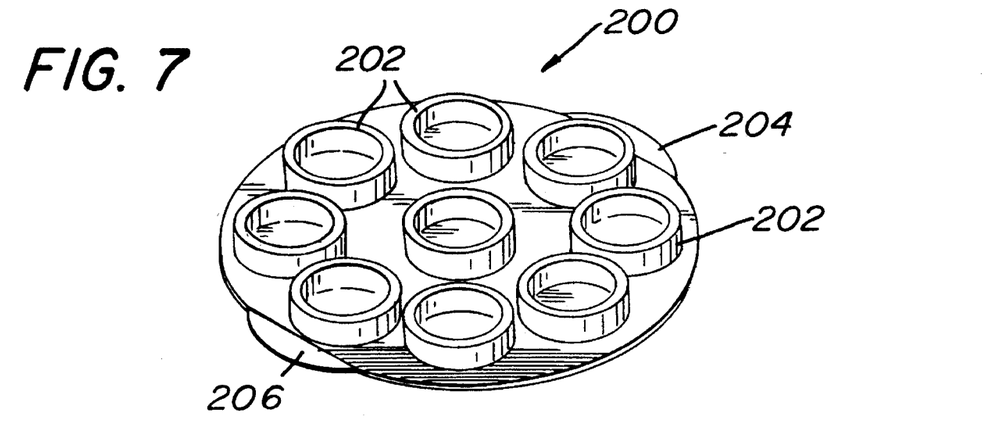
FIG. 7 is an isometric view of a food supporting member in the form of an egg supporting tray useable in the multi-purpose cooker of this invention.

Referring to FIG. 7, an additional form of food retaining member is shown at 200. This member is designed to support eggs therein, which are to be cooked by steaming in the cooker 10. Specifically, the food retaining member has a plurality of mounting cylinders 202 molded integrally within the structure for supporting a plurality of eggs therein. The member 200, like the food retaining members 48 and 50, include diametrically opposed extensions 204 and 206 for permitting the member to be grasped by a person. Also, like members 48 and 50, the member 200 has a downwardly extending annular flange (not shown) for cooperating with the lugs 34 of the support member 28 in the same manner as described above in connection with the members 48 and 50.

Figure 8:
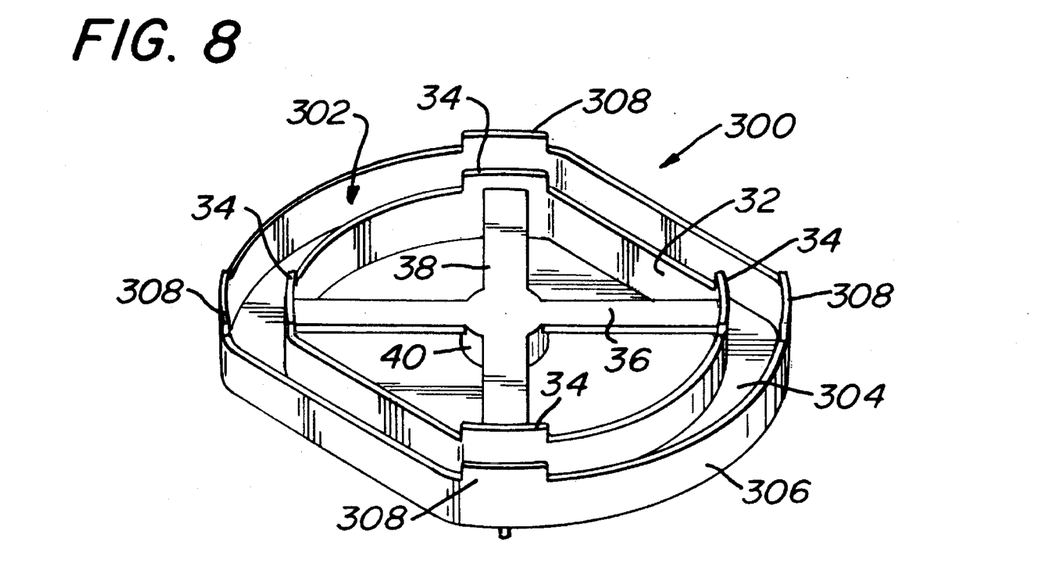
FIG. 8 is an isometric view of an alternate design for a supporting member utilized in the steaming mode of operation of the cooker of this invention.

Referring to FIG. 8, an alternate form of support member is illustrated at 300. This support member is similar to the support member 28, but further includes an annular collection trough 302 for condensate, which is disposed in vertical alignment with the openings 88 in the peripheral section 86 of the bottom wall 82 of the food retaining member 48 during the steaming operation of the cooker 10. In this construction, condensate that forms and/or is collected in the food retaining member 48 flows to the periphery of the bottom wall 82, and then through the openings 88 into the annular collection trough 302. Thus, condensate carrying food particles or juices from the food being cooked will not be directed back into the hot water in the compartment 20, but rather will be isolated in the collection trough 302.

It should be understood that the support member 300 includes an inner peripheral wall 32, upstanding lugs 34 on the inner peripheral wall, a pair of arms 36 and 38, and a closure or hub 40, all of which provide the same function as the corresponding members of the support member 28. However, the support member 302 also includes a bottom wall 304 and an annular outer wall 306 for cooperating with the inner peripheral wall 32 to form the collection trough 302. In this latter embodiment the annular outer wall 306 includes circumferentially spaced-apart upstanding lugs 308 in radial alignment with the lugs 34. Moreover, the lugs 34 and 308 have upper distal surfaces which are substantially in the same horizontal plane for engaging the lower surface of the bottom walls of the food retaining members 48, 50 or 200.

Without further elaboration, the foregoing will so fully illustrate my invention that others may, by applying current or future knowledge, adopt the same for use under various conditions of service.

What is claimed as the invention is:

1. A multi-purpose cooker usable for both steaming and dehydrating foods, said cooker including:

A. a base member including a compartment therein;

B. a cover member cooperable with the base member for providing a food-steaming and food-dehydrating chamber including the compartment of said base member o said chamber retaining water therein during steaming of foods; and C. first food retaining means retainable in the chamber for supporting food to be dehydrated; and D. second food retaining means retainable in the chamber for supporting food to be steamed, said second food retaining means having a different structure from said first food retaining means.

2. The multi-purpose cooker of claim 1, wherein said base member includes a heater and a switch for selectively energizing said heater, said cover member including venting passage means therein for communicating with said compartment, said first food retaining means for supporting food to be dehydrated including at least one first food retaining member having a porous food supporting surface through which dry heated air in said chamber can pass for dehydrating food retained on said porous surface, and said second food retaining means for supporting food to be steamed including a second food retaining member having a food supporting surface for supporting food to be steamed by the flow of steam within said chamber.

3. The multi-purpose cooker of claim 2, including a plurality of said first food retaining members vertically stackable on each other with the porous food supporting surface of each of said first food retaining members being vertically spaced from an adjacent porous food supporting surface.

4. The multi-purpose cooker of claim 2, including a support member retainable in said compartment of the base member under said second food retaining member for supporting the second food retaining member in said compartment when the cooker is utilized to steam foods.

5. The multi-purpose cooker of claim 2, including a support member separate from said second food retaining member and retainable in said compartment of the base member under said second food retaining member for supporting the second food retaining member in said compartment when the cooker is utilized to steam foods.

6. The multi-purpose cooker of claim 2, including a support member separate from said second food retaining member and retainable in said compartment of the base member under said second food retaining member for supporting said second food retaining member in said compartment when the cooker is utilized to steam foods, said support member including a collection trough for collecting condensate generated from the steaming of foods.

7. The multi-purpose cooker of claim 2, wherein said second food retaining member includes a bottom wall for retaining food to be steamed thereon, said bottom wall including a first liquid-impervious section for retaining condensate thereon, and a second section at which condensate can leave said second food retaining member.

8. The multi-purpose cooker of claim 2, wherein said second food retaining member includes a bottom wall for retaining food to be steamed thereon, said bottom wall including a first liquid-impervious section for retaining condensate thereon, and a second section including passages therethrough for permitting condensate to leave said second food retaining member.

9. The multi-purpose cooker of claim 8, including a support member separate from said second food retaining member and retainable in said compartment of the base member under said second food retaining member for supporting said second food retaining member in said compartment when the cooker is utilized to steam foods, said support member including a collection trough underlying the passages in the second section of the bottom wall of the second food retaining member for collecting condensate generated from the steaming of foods and passing through said passages.

10. The multi-purpose cooker of claim 2, wherein said base member includes an inner wall defining said compartment, a passage extending through said inner wall, a fan means for directing air into close proximity to said heater and through said passage into said chamber when said fan means is energized, and switch means for energizing both said fan means and said heater and switch means for energizing said heater without energizing said fan means.

11. The multi-purpose cooker of claim 2, wherein said base member includes an inner wall defining said compartment and an outer wall spaced from said inner wall, a passage extending through said inner wall and communicating with the space between the inner and outer walls, a fan means retained in the space between the inner and outer walls for directing air into close proximity to said heater and through said passage and into the chamber when said fan means is energized, and switch means for energizing both said fan means and said heater and switch means for energizing said heater without energizing said fan means.

12. The multi-purpose cooker of claim 10, further including a closure member for closing the opening into said passage when food is steamed.

13. The multi-purpose cooker of claim 11, further including a closure member for closing the opening into said passage when food is steamed.

14. The multi-purpose cooker of claim 10, further including a support member separate from said second food retaining member and retainable in said compartment of the base member under said second food retaining member for supporting the second food retaining member in said compartment when the cooker is utilized to steam foods, said support member including a closure for closing the opening into said passage.

15. The multi-purpose cooker of claim 11, including a support member separate from said second food retaining member and retainable in said compartment of the base member under said second food retaining member for supporting said second food retaining member in said compartment when the cooker is utilized to steam foods, said support member including a closure for closing the opening into said passage and a collection trough for collecting condensate generated from the steaming of foods.

16. The multi-purpose cooker of claim 14, wherein said second food retaining member includes a bottom wall for retaining food to be steamed thereon, said bottom wall including a first liquid-impervious section for retaining condensate thereon, and a second section at which condensate can leave said second food retaining member.

17. The multi-purpose cooker of claim 15, wherein said second food retaining member includes a bottom wall for retaining food to be steamed thereon, said bottom wall including a first liquid-impervious section for retaining condensate thereon, and a second section at which condensate can leave said second food retaining member.

18. The multi-purpose cooker of claim 14, wherein said second food retaining member includes a bottom wall for retaining food to be steamed thereon, said bottom wall including a first liquid-impervious section for retaining condensate thereon, and a second section including passages therethrough for permitting condensate to leave said second food retaining member.

19. The multi-purpose cooker of claim 15, wherein said second food retaining member includes a bottom wall for retaining food to be steamed thereon, said bottom wall including a first liquid-impervious section for retaining condensate thereon, and a second section including passages therethrough for permitting condensate to leave said second food retaining member, said passages being in substantial vertical alignment with the collection trough.

20. The multi-purpose cooker of claim 2, wherein said second food retaining member includes a bottom wall for retaining food to be steamed thereon, said bottom wall including a first liquid-impervious section for retaining condensate thereon, and a second section at which condensate can leave said second food retaining member, further including a third food retaining member having a bottom wall which is liquid-impervious over its entire area for precluding condensate from leaving said third food retaining member.

21. The multi-purpose cooker of claim 2, wherein said second food retaining member includes a bottom wall for retaining food to be steamed thereon, said bottom wall including a first liquid-impervious section for retaining condensate thereon, and a second section including passages therethrough for permitting condensate to leave said second food retaining member, further including a third food retaining member having a bottom wall which is liquid-impervious over its entire area for precluding condensate from leaving said third food retaining member.

22. The multi-purpose cooker of claim 2, further including an additional food retaining member including a plurality of spaced egg supporting members on a surface thereof.

23. The multi-purpose cooker of claim 2, wherein said cover member includes a first section with the venting passage means therein, said venting passage means including a plurality of passageways extending through said first section, and a second section rotatable on said first section for selectively opening or closing a portion or all of said passageways.

24. A multi-purpose cooker usable for both steaming and dehydrating foods, said cooker including:

A. a base member including a compartment therein;

B. a cover member cooperable with the base member for providing a food-steaming and food-dehydrating chamber including the compartment of said base member, said chamber retaining water therein during steaming of foods; and C. a first food retaining member retainable in the chamber; and D. a second food retaining member retainable in the chamber, said second food retaining member having a different structure from said first food retaining member.

* * * * *